UNITED STATES PATENT OFFICE.

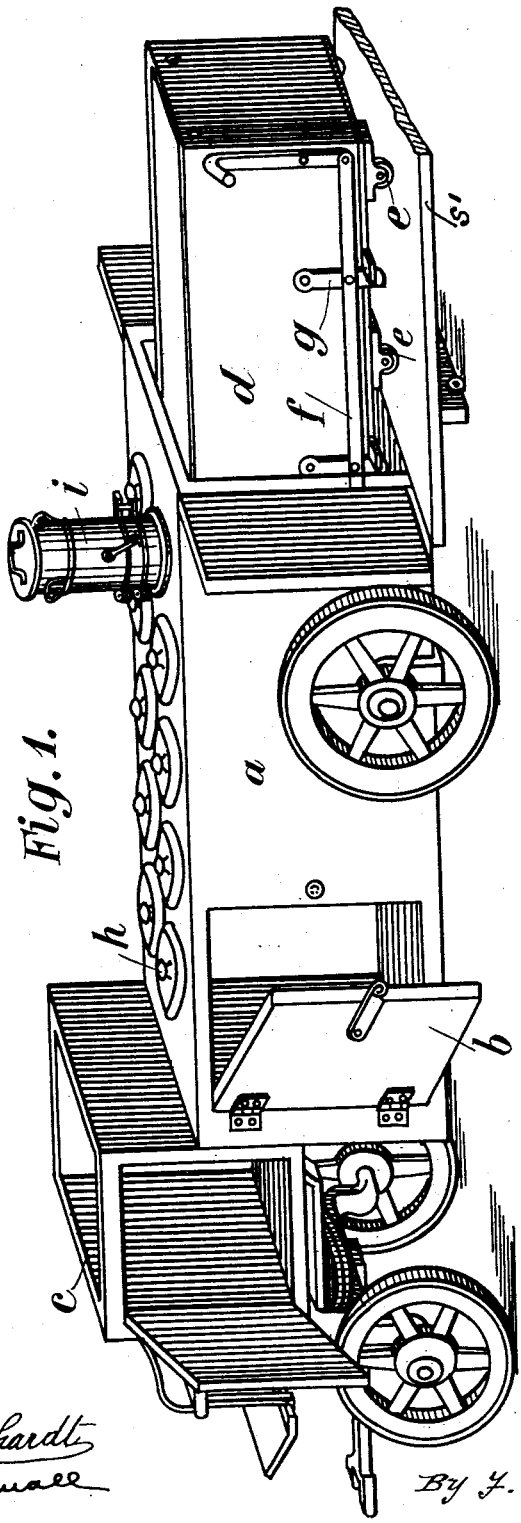

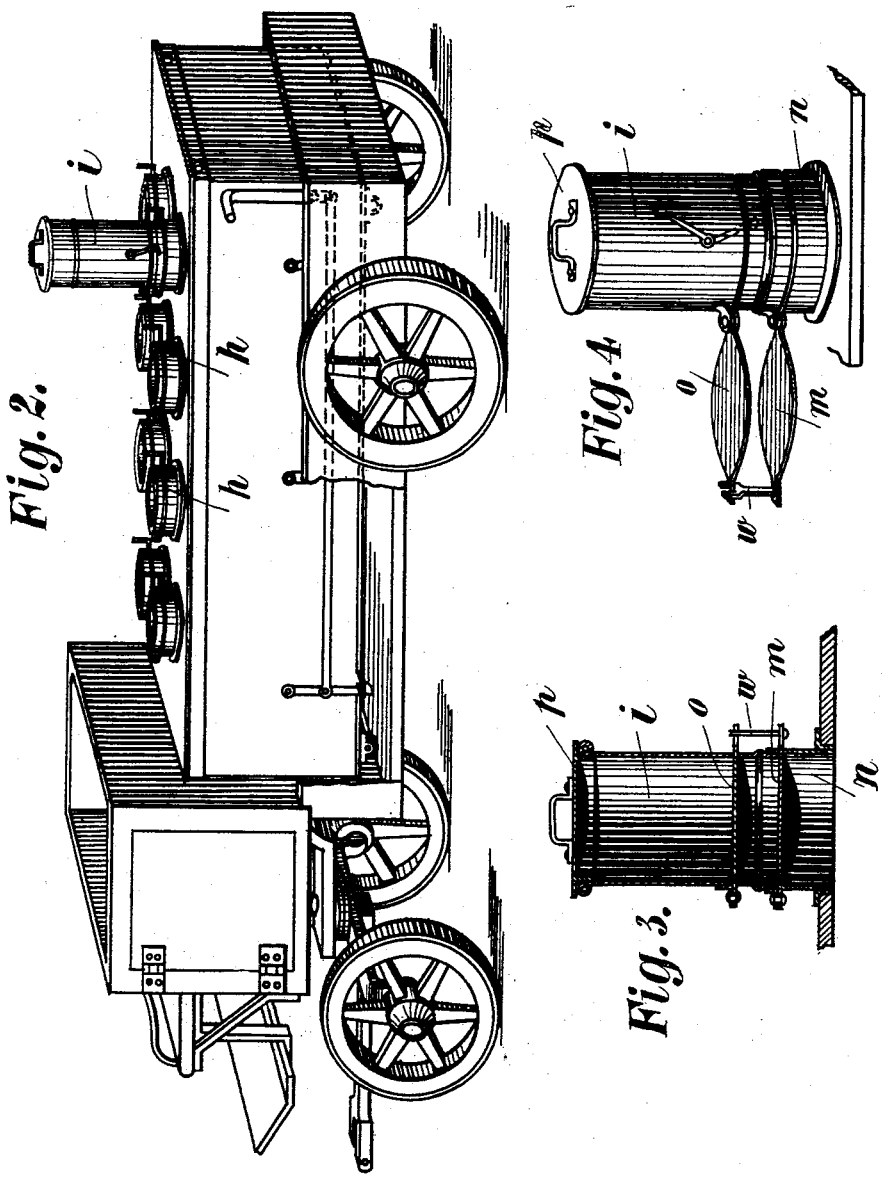

ALBERT GULL, OF ZURICH, AND JOSEF MÜLLER, OF EGLISAU, SWITZERLAND.

CART FOR COLLECTING AND REMOVING SWEEPINGS.

SPECIFICATION forming part of Letters Patent No. 710,453, dated October 7, 1902.

Application filed October 18, 1901. Serial No. 79,147. (No model.)

*To all whom it may concern:*

Be it known that we, ALBERT GULL, residing at 3 Netzgergasse, Zurich, and JOSEF MÜLLER, residing at Bahnhofplatz, Eglisau, in the Republic of Switzerland, citizens of the Republic of Switzerland, have invented new and useful Improvements in Carts for Collecting and Removing Sweepings, (for which we have made application for patents in Switzerland, No. 27,657, dated September 13, 1901; in Germany, dated September 20, 1901; in Austria, dated September 21, 1901; in Belgium, dated September 23, 1901; in France, dated September 25, 1901, and in England, No. 19,452, dated September 30, 1901,) of which the following is a specification.

Our invention has for its objects to provide an improved construction of cart for collecting and removing sweepings in a hygienic manner. We attain these objects by the means illustrated in the accompanying drawings, in which—

Figure 1 shows in perspective an open cart with drawn-out collecting-receptacle and delivery vessel, and Fig. 2 a cart closed; Figs. 3 and 4, a vertical section and a perspective view, respectively, of the delivery vessel.

Similar letters refer to similar parts throughout the several views.

In carrying out our invention, as shown in Fig. 1, we form the body of the said cart with a chamber *a*, having doors *b* and a box *c* in front thereof, closable by a door and adapted to receive tools and also large articles collected.

In the cart-chamber *a* is employed to run on wheels *e* the collecting-receptacle *d*, the top of which is open and its bottom hinged to drop and adapted to be locked in position when closed and be released when required by the latches *g*, coupled to a rod *f*, actuated by a lever. The top of the chamber *a* has openings closable by lids *h*, over which openings when the latter are removed the vessel *i* is placed, which serves to deliver the sweepings into the collecting-receptacle *d* through the said openings. The delivery vessel is composed of the top *i* and socket *n*, the former being furnished with a lid *p*. Each of these parts has a pivoted slide *o* and *m*, respectively, the former serving also as a bottom and the latter as a lid, which slides are coupled together by a fork *w*, secured to the slide *m*, so that they can be simultaneously opened or closed, as may be required. By removing the said socket the said top may be used as a bin for domestic purposes. The delivery-opening and the like being in every respect closable, the manner of collecting the sweepings is performed most hygienically.

What we claim as our invention, and desire to secure by Letters Patent, is—

1. In a cart for collecting and removing sweepings, a chamber with closable openings in the top, a withdrawable receptacle therein with open top and drop-bottom, sockets in the said openings and removable delivery vessels therein, the said openings communicating with the open top of the said collecting-receptacle and the said sockets and delivery vessels having a movable lid and bottom respectively, all combined substantially as and for the purpose set forth.

2. In a cart for collecting and removing sweepings, a chamber with closable openings in the top, a withdrawable receptacle therein with open top and drop-bottom, sockets in the said openings and removable delivery vessels therein, the said openings communicating with the open top of the said collecting-receptacle and the said sockets and delivery vessels having a pivoted lid and bottom respectively coupled together and jointly movable laterally, all combined substantially as and for the purpose set forth.

In witness whereof we have hereunto set our hands in presence of two witnesses.

ALBERT GULL.
JOS. MÜLLER.

Witnesses:
FRITZ LAUENER,
A. LIEBERKNECHT.